United States Patent Office 3,002,923
Patented Oct. 3, 1961

3,002,923
WATER-IN-OIL EMULSION DRILLING FLUID
George E. Barker, Norristown, Pa., and James Hurst, Wilmington, Del., assignors to Atlas Chemical Industries, Inc., a corporation of Delaware
No Drawing. Filed Mar. 29, 1957, Ser. No. 649,282
20 Claims. (Cl. 252—8.5)

This invention relates to an improved water-in-oil emulsion drilling fluid for use in earth boring. More particularly, it relates to a water-in-oil emulsion drilling mud which employs an emulsifier from a class of amide type, oil-soluble, surface-active agents.

No other single factor has been as important in the drilling industry's continuing effort to improve drilling rates and practices as the growth of a body of knowledge concerning drilling mud compositions and properties. Recently, water-in-oil emulsion drilling fluids containing over 30 volume percent water have been developed. In such fluids, oil is the continuous phase which forms a film around finely divided water droplets.

The water-in-oil fluids which have been developed to date are not general-purpose drilling fluids, but are rather designed for specific and specialized applications. They have been used as completion fluids in water-sensitive producing formations, as work-over fluids, as gun perforating fluids, and for drilling salt and anhydrite sections.

Usual current water-in-oil emulsion muds are limited in their application because (a) at 200° F. and higher, not unusual bottom hole circulating temperatures, the emulsions are unstable and there is gel formation, (b) the emulsions are unable to withstand contamination by large amounts of brine or alkali and, (c) the changeover from a water-base fluid to the water-in-oil fluid, in the course of the specialized use of the latter, involves a complete conversion (i.e. the disposal of all the waterbase fluid and the mixing of an entirely fresh batch of drilling mud).

An object of this invention is, therefore, the development of a general purpose water-in-oil emulsion drilling fluid.

An additional object of this invention is the development of a stable water-in-oil emulsion drilling fluid that is unaffected by bottom hole circulating temperatures over 200° F.

An additional object of this invention is to create a water-in-oil drilling fluid which is unaffected by large amounts of salt water contamination.

Another object of this invention is to produce a drilling fluid which is unaffected by alkali contamination or by contamination with large amounts of other materials likely to be encountered under use conditions.

A further object of this invention is to provide a drilling fluid which possesses desirable fluid-loss, viscosity, and gel strength characteristics. The fluid is also nonflammable and, compared to oil-base muds, unobjectionable to handle.

Still another object of the invention is the creation of a drilling fluid which is capable of utilizing a water-base fluid for the water phase of the water-in-oil emulsion, thus facilitating a smooth change-over from a water-base fluid to a water-in-oil emulsion drilling fluid.

The above objects of this invention as well as additional objects will be apparent to those skilled in the art from a consideration of the following description and claims.

The drilling muds of this invention in large measure owe their novel and unusual properties to the use of members of a new class of amide type oil-soluble surfaceactive agent. Depending upon initial water phase content and the amount and type of solid additives present, drilling fluids of the invention usually can be contaminated with large percentages, up to 50%, of either brine, red bed mud or 5% caustic soda solution, with only insignificant effect on viscosity, gel strength and fluidloss properties.

The extreme stability of these emulsion drilling fluids over a wider range of temperature and in the presence of many contaminants indicates the outstandingly superior emulsifying ability of this class of amide type compounds.

Convenient starting materials for the synthesis of the above compounds are the glucamines and the N-alkyl glucamines. Details of the preparation of the N-alkyl glucamines may be found in an article by P. Karrer and E. Herkenrath, Helv. Chim. Acta., vol. 20, page 83–86 (1937), and also in an article by Mitts and Hixon, Jl. Am. Chem. Soc., vol. 66, pages 483–486 (1944). Preparations of methyl, ethyl, propyl, n-butyl, isobutyl, pentyl, hexyl and cyclohexyl glucamines are disclosed in these articles.

The amides employed are the amides of glucamine, N-alkyl glucamine, or anhydro derivatives of either. The amides of glucamine and N-alkyl glucamine may be formed by heating one mole of the aforementioned amines with one mole of fatty acid at temperatures less than about 175° C. until one mol of water splits out of the reaction mass. If the reaction is carried out at a temperature of 175° C. or higher, it may be continued beyond the point where one mol of water has split out and anhydrization of the polyol constituent will result in the production of further quantities of water. Preferred products for use in accordance with the present invention are anhydro amides produced when the reaction is conducted at these higher temperatures for a length of time sufficient to split out two mols of water per mole of fatty acid.

The production of some suitable compounds is discussed in Patent No. 1,985,424 of Dec. 25, 1934, and Patent No. 2,703,798 of March 8, 1955.

Aliphatic monocarboxylic acids which may be used for the amidation are those having from 12 and 26 carbon atoms per molecule and include among others oleic, erucic, stearic, lauric, tridecanoic, myristic, pentadecanoic, palmitic, margaric, nonadecanoic, arachidic, behenic, liquoceric, cerotic, lauroleic, linderic, myristoleic, palmitoleic, elaidic, cetoleic, linoleic, linolenic, aliphatic acids derived from petroleum by oxidation, tallow fatty acids and mixtures thereof.

In the course of the amidation some simultaneous esterification occurs. The amount of esterification which occurs relative to amidation depends upon a number of factors such as the time and temperature of reaction and the mole ratios of fatty acid to glucamine. In general, higher temperatures and prolonged reaction times favor amidation. Formation of ester-amides, however, does not interfere with the utilization of these compounds as drilling mud emulsifiers.

Of considerable importance however in any emulsifier is maintenance of a proper ratio between hydrophilic and hydrophobic constituents. As is well known in the art, hydroxyl groups such as are present in a polyol residue give molecules hydrophilic characteristics whereas alkyl and fatty acid residues contribute hydrophobic characteristics. In order to maintain a proper hydrophilic-hydrophobic balance in the compounds of the invention, it has been found necessary that the sum of the carbon atoms in the alkyl group which is attached to the nitrogen atom and the carbon atoms derived from the fatty acid total at least 15. Thus, for example, when lauric acid is used for amidation, the alkyl group attached to the nitrogen atom must contain at least 3 carbon atoms.

The emulsifiers may be represented as comprising compounds having the following formula or esters of compounds having the following formula:

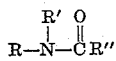

wherein R is a monovalent organic residue of a hexane pentol or ananhydro hexane pentol; R' is hydrogen or either an alkyl or cyclo-alkyl hydrocarbon radical which contains up to 6 carbon atoms;

is the acyl radical of an aliphatic monocarboxylic acid which contains from 12 to 26 carbon atoms per molecule; provided, however, that the carbon atoms in R' plus those in the acyl radical total at least 15.

Examples of the preparation of some typical amide products, which are suitable for use in the drilling muds of the invention, follow:

Example 1

1,410 grams of oleic acid were added to 990 grams of N-methyl glucamine. To reduce foaming 82.5 grams of the product of a previous batch were added to the reaction mixture. The mixture was heated for 1½ hours at temperatures up to 195 deg. C., during which time 157 cc. of water were evolved and collected from the reaction mass. The resulting product, an oleic amide of anhydro methyl glucamine, had an acid number of 6.2, a saponification number of 29 and a hydroxyl number of 400.

Example 2

286 grams of stearic acid were added to 200 grams of N-methyl glucamine. The reactants were heated to 180° C. and held between 180° and 185° C. for three hours. During that time 34.5 ml. of water were evolved and collected from the reaction mass. The resulting product, a stearic amide of anhydro methyl glucamine, had an acid number of 3.7, a saponification number of 27.7 and a hydroxyl number of 411.

Typical drilling fluids employing the amide as the emulsifier also include a water phase (preferably containing salt) and an oil phase. It is often desirable to include additional components which are conventional in the art. Concentration and utility of some of these in particular water-in-oil emulsion drilling fluids of this invention will be discussed.

The drilling fluid or mud should contain from about 40 to about 75 volume percent of water phase. These limits are a function of the viscosity and density characteristics required for the particular drilling application and represent a preferred though not a critical range. Sea water or oil-field brine can be advantageously used since they are generally more readily available than fresh water. Their salt content also contributes to emulsion stability. In general, any water-soluble salt of the alkali metals and alkaline earth metals may be used. The final salt content of the water phase may range from 2% by weight to complete saturation, however, the range above about 5% is usually preferred.

An oil phase is employed in an amount necessary to make up the difference between the percent of water phase and 100%. Any type of animal, vegetable or mineral oil may be used, but it has been found that a refined hydrocarbon oil, such as No. 2 fuel oil, diesel fuel oil, or kerosene is preferable. These oils are of known composition and it is, therefore, easy to control the external phase of the emulsion.

Some solid additives serve to increase the density of the fluid when necessary. These solids such as barium sulfate, iron oxide and strontium sulfate are usually termed weighting agents. The amount of weighting agent added is a function of the desired mud density.

Other solid additives such as, for example, ground limestone, work-over clay, bentonite and kaolin clays are usually employed as fluid loss control agents since they give the drilling fluid plastering properties. These materials are usually finely ground (e.g. about 200 standard mesh) and are often added to the extent of about 20 pounds per barrel.

It is sometimes advantageous to use a non-ionic, water-soluble emulsifier in addition to the amide to gain increased emulsion stability. In the following table, wherein the numbers in parentheses represent mols of ethylene oxide, some of the many non-ionic water soluble emulsifiers which can be used are listed:

| Trademark | Chemical Description |
|---|---|
| Renex 20 | Polyoxyethylene mixed esters of fatty and resin acids. |
| Tween 80 | Polyoxyethylene (20) sorbitan monooleate. |
| Myrj 52 | Polyoxyethylene (40) stearate. |
| Renex 30 | Polyoxyethylene (12) tridecyl alcohol. |
| Triton X-100 | Polyoxyethylene nonyl phenol. |
| "Staybelite" | Polyoxyethylene hydrogenated rosin. |

The water-soluble emulsifier is usually preferably added in concentrations ranging from 0.1 to 5 pounds per barrel of drilling fluid.

It has also been found that the presence of a fatty acid soap in the formulation is advantageous, particularly when the drilling fluids are to be weighted with materials such as barium sulfate.

The fatty acid soap may be added to mud formulations as a separate item or formed in situ as an ancillary reaction to the amidation with fatty acid. Regardless of its source or point of addition to the formulation, the soap of an aliphatic mono-carboxylic acid, when used, is preferably added within the range of about 15 to 35 parts (by weight) per 100 parts (by weight) of the active amide type emulsifier. About 20 parts per 100 parts of amide is generally an optimum quantity of soap.

About 3 to 11 pounds per bbl. of the amide type emulsifier are added to each bbl. of drilling mud, with about 5 pounds per bbl. being a preferred quantity for a non-weighted mud.

Some suggested formulations for drilling mud which are representative of the invention follow, in which all quantities are given in parts by weight:

Example 3

| | |
|---|---|
| Saturated salt water | 252 |
| No. 2 fuel oil | 117 |
| Product of Example 1 | 5 |

Example 4

| | |
|---|---|
| Saturated salt water | 252 |
| No. 2 fuel oil | 117 |
| 200 mesh bentonite clay | 20 |
| Renex-30 | 3 |
| Stearic acid amide of N-ethyl glucamine | 5 |

Example 5

| | |
|---|---|
| Saturated salt water | 280 |
| No. 2 fuel oil | 120 |
| 200 mesh bentonite clay | 20 |
| Lauric acid amide of N-hexyl glucamine | 5 |

Example 6

| | |
|---|---|
| Saturated salt water | 280 |
| No. 2 fuel oil | 120 |
| 200 mesh bentonite clay | 20 |
| Tallow fatty acid amide of glucamine | 5 |

Example 7

| | |
|---|---|
| Saturated salt water | 252 |
| No. 2 fuel oil | 117 |
| Product of Example 2 | 5 |

Example 8

| | |
|---|---|
| Saturated salt water | 252 |
| No. 2 fuel oil | 117 |
| 200 mesh bentonite clay | 20 |
| Renex-30 | 3 |
| Myristic acid amide of anhydro glucamine | 5 |

Example 9

| | |
|---|---|
| Saturated salt water | 280 |
| No. 2 fuel oil | 120 |
| 200 mesh bentonite clay | 20 |
| Lauric acid amide of anhydro N-cyclo hexyl glucamine | 10 |

Example 10

| | |
|---|---|
| Saturated salt water | 150 |
| No. 2 fuel oil | 117 |
| 200 mesh bentonite | 20 |
| Renex-20 | 3 |
| Barium sulfate | 400 |
| Sodium erucate | 1 |
| Erucic acid amide of glucamine | 5 |

Example 11

| | |
|---|---|
| Saturated salt water | 100 |
| Diesel oil | 117 |
| 200 mesh bentonite | 20 |
| Barium sulfate | 400 |
| Sodium oleate | 3 |
| Product of Example 1 | 10 |

Formulations of this general type exhibit high emulsion stability at temperatures of 200 and 300 deg. F. In static oil separation tests at these temperatures only a relatively minor percentages of oil separates. Low fluid loss, low gel strength, and workable viscosity are also characteristics of these formulations.

It has been discovered that if the products of this invention are mixed with the solid fluid-loss control materials, a mixed composition can be obtained in the form of a dry free-flowing powder containing at least 25% active amide. Such dry, free-flowing powders are of great convenience in accurately formulating muds in the field, in making handling economies possible, and in allowing for easy formation of oil solutions of emulsifier. A dry powder which flows freely at room temperature can be made by using at least about 60% by weight of bentonite.

It is also possible to add a soap, for instance an alkali soap, such as sodium oleate, during the blending. If this is done, less bentonite or the like need be used to obtain a free-flowing product. A typical formulation of pre-packaged additives has a weight distribution as follows:

| | Percent |
|---|---|
| Amide product of Example 1 | 27 |
| Sodium oleate | 6 |
| Bentonite | 67 |

An alternative procedure is to ship the amide as a solution. A 60% solution of the amide dissolved in an aromatic solvent derived from petroleum has been found to be excellent for this purpose and has substantially the same advantages as the powdered blend. When this material is used, the hydrocarbon solvent becomes part of the oil phase of the final drilling fluid.

Of considerable practical importance in the utilization of water-in-oil emulsion drilling fluids wherein the emulsifier is any surface active agent of the amide type which is unaffected by alkali is the fact that a water-base mud, such as is often used during the initial stages of a drilling operation, may be used as the water phase of the water-in-oil emulsion drilling fluid. These water-base muds often have a high pH to prevent starch fermentation and/or repress calcium ion solubilization. Since the instant emulsifiers, as has been stated above, are unaffected by the presence of alkali, the high pH of some water base fluids does not prevent them from being used as the water phase of the water-in-oil emulsion.

The conversion from water-base mud to water-in-oil emulsion is made, briefly, by adding an oil solution of the amide type emulsifier to the water base mud, creating an emulsion, and thereafter adding any additional oil as well as other ingredients which may be required for the final water-in-oil formulation.

In the field a suggested procedure would involve the addition of oil and emulsifier to an empty mud pit. Such solutions are more easily formed if either the dry, free-flowing powder type or aromatic solution type of emulsifier blend is used initially. The required amount of water-base mud is then pumped from the hole to the pit and the entire contents of the pit circulated through the mud pumps and jetted until an emulsion is formed. Depending upon the relative volumetric capacities of the hole and mud pit one or more such operations may be necessary to complete the conversion. On the other hand, with the utilization of proportioning pumps and in-the-line mixing equipment, the changeover can be accomplished as a continuous process.

The muds of this invention can be used in any conventional manner for drilling wells. The mud may be mixed in mud pits and pumped into the drill hole through the hollow drill stem of the rotary drilling equipment. The mud leaving through eyes in the drill bit which is attached to the drill stem contacts the walls of the well hole, thus performing a plastering function while simultaneously removing cuttings and performing other functions. The mud may be returned to the pits via the annulus between the borehole and the drill stem. When the cuttings have been separated and any lost mud replaced, the mud is recycled to the well.

It will be understood that while specific examples of chemical reactions and mud formulations have been presented, the invention is not to be limited by these examples.

What is claimed is:

1. A stable water-in-oil emulsion drilling fluid comprising a water phase, an oil phase and from about 3 to 11 lbs. per bbl. of an emulsifier component consisting essentially of an oil soluble, surface-active agent selected from the group consisting of compounds having the following formula:

and esters thereof wherein: R is a monovalent organic residue selected from the group consisting of hexane pentols and anhydro hexane pentols; R' is selected from the group consisting of hydrogen, alkyl hydrocarbon radicals which contain up to 6 carbon atoms and cyclo alkyl hydrocarbon radicals which contain up to 6 carbon atoms;

is the acyl radical of an aliphatic monocarboxylic acid which contains from 12 to 26 carbon atoms per molecule; provided however that the carbon atoms in R' plus those in the aforesaid acyl radical total at least 15.

2. The drilling fluid of claim 1 which further includes at least 15 parts by weight of alkali metal soap per 100 parts by weight of the oil-soluble, surface-active agent.

3. A stable water-in-oil emulsion drilling fluid which comprises a water phase, an oil phase and from about 3 to 11 lbs. per bbl. of an emulsifier component consisting essentially of an oil-soluble, surface-active agent selected from the group consisting of the fatty acid amides of an anhydro N-alkyl glucamine, and esters of said amides; wherein said N-alkyl group contains not more than 6 carbon atoms and wherein further the total of the carbon atoms in said N-alkyl group and said amidating fatty acid is at least 15.

4. The drilling fluid of claim 3 wherein the said alkyl group is methyl.

5. The drilling fluid of claim 3 wherein the said fatty acid contains 18 carbon atoms.

6. The drilling fluid of claim 5 wherein the said alkyl group is methyl.

7. The drilling fluid of claim 6 which further includes at least 15 parts by weight of alkali metal soap per 100 parts by weight of the aforesaid oil-soluble, surface-active agent.

8. A stable water-in-oil emulsion drilling fluid which comprises a water phase, an oil phase and from about 3 to 11 lbs. per bbl. of an emulsifier component consisting essentially of an oil-soluble, surface-active agent selected from the group consisting of fatty acid amides of an N-alkyl glucamine and esters of said amides; wherein said N-alkyl group contains not more than 6 carbon atoms and wherein further the total of the carbon atoms in said N-alkyl group and said amidating fatty acid is at least 15.

9. The drilling fluid of claim 8 wherein the said alkyl group is methyl.

10. The drilling fluid of claim 8 wherein the said fatty acid contains 18 carbon atoms.

11. The drilling fluid of claim 10 wherein the said alkyl group is methyl.

12. A stable water-in-oil emulsion drilling fluid which comprises a water phase, an oil phase and from about 3 to 11 lbs. per bbl. of an emulsifier component consisting essentially of an oil-soluble, surface-active agent selected from the group consisting of fatty acid amides of glucamine and esters of said amides provided however that said amidating fatty acid contain at least 15 carbon atoms.

13. The drilling fluid of claim 12 wherein the said fatty acid contains 18 carbon atoms.

14. A stable water-in-oil emulsion drilling fluid which comprises a water phase, an oil phase and from about 3 to 11 lbs. per bbl. of an emulsifier component consisting essentially of an oil-soluble, surface-active agent selected from the group consisting of fatty acid amides of anhydro glucamine and esters of said amides provided however that said amidating fatty acid contain at least 15 carbon atoms.

15. The drilling fluid of claim 14 wherein the said fatty acid contains 18 carbon atoms.

16. A dry, free-flowing solid concentrate for adding to water and oil to prepare water-in-oil emulsion drilling fluids which comprises, at least about 60 weight percent of bentonite, and at least 25 weight percent of an oil-soluble surface-active agent selected from the group consisting of compounds having the following formula:

$$\begin{array}{c} R' \ O \\ | \ \| \\ R-N-CR'' \end{array}$$

and esters of said compounds wherein: R is a monovalent organic residue selected from the group consisting of hexane pentols and anhydro hexane pentols; R' is selected from the group consisting of hydrogen, alkyl hydrocarbon radicals which contain up to 6 carbon atoms and cyclo alkyl hydrocarbon radicals which contain up to 6 carbon atoms;

is the acyl radical of an aliphatic monocarboxylic acid which contains from 12 to 26 carbon atoms per molecule; provided however that the carbon atoms in R' plus those in the aforesaid acyl radical total at least 15.

17. The dry, free-flowing solid additive of claim 16 which further includes at least 3.5 weight percent of an alkali metal soap.

18. A dry, free-flowing solid concentrate for adding to water and oil to prepare water-in-oil emulsion drilling fluids which comprises at least about 60 weight percent of bentonite and at least 25 weight percent of an oil-soluble, surface-active agent, said agent being the amide type reaction product of oleic acid and anhydro methyl glucamine.

19. A method of converting a water-base drilling fluid to a water-in-oil emulsion drilling fluid during the course of a rotary earth drilling operation wherein the said water-base fluid becomes the water phase of the said emulsion drilling fluid which comprises the steps of making an oil solution of an oil-soluble, surface-active agent selected from the group consisting of compounds having the following formula

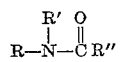

and esters of said compounds wherein: R is a monovalent organic residue selected from the group consisting of hexane pentols and anhydro hexane pentols; R' is selected from the group consisting of hydrogen, alkyl hydrocarbon radicals which contain up to 6 carbon atoms and cyclo alkyl hydrocarbon radicals which contain up to 6 carbon atoms;

is the acyl radical of an aliphatic monocarboxylic acid which contains from 12 to 26 carbon atoms per molecule; provided however that the carbon atoms in R' plus those in the aforesaid acyl radical total at least 15, combining said solution with said water-base fluid and emulsifying said solution with said fluid, said oil-soluble surface-active agent having been added in an amount sufficient to give a final water-in-oil emulsion drilling fluid which contains from about 3 to 11 lbs. per bbl. of said agent.

20. A method for drilling a well in which a hollow drill stem having a drill bit attached thereto is rotated to form a borehole in the earth's surface which comprises circulating a stable water-in-oil emulsion drilling fluid comprising a water phase, an oil phase and from about 3 to 11 lbs. per bbl. of an emulsifier component consisting essentially of an oil soluble, surface-active agent selected from the group consisting of compounds having the following formula:

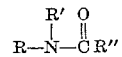

and esters of said compounds wherein: R is a monovalent organic residue selected from the group consisting of hexane pentols and anhydro hexane pentols; R' is selected from the group consisting of hydrogen, alkyl hydrocarbon radicals which contain up to 6 carbon atoms and cyclo alkyl hydrocarbon radicals which contain up to 6 carbon atoms;

is the acyl radical of an aliphatic monocarboxylic acid which contains from 12 to 26 carbon atoms per molecule; provided however that the carbon atoms in R' plus those in the aforesaid acyl radical total at least 15; down said drill stem and out through eyes in said drill bit and then upwardly in said borehole around said drill stem, collecting said drilling fluid, removing cuttings therefrom, adjusting the quantity and composition thereof and returning said fluid to said drill stem.

References Cited in the file of this patent

UNITED STATES PATENTS

| | | |
|---|---|---|
| 1,985,424 | Piggott | Dec. 25, 1934 |
| 2,259,466 | Harris et al. | Oct. 21, 1941 |
| 2,497,398 | Dawson | Feb. 14, 1950 |
| 2,661,334 | Lummus | Dec. 1, 1953 |
| 2,689,219 | Menaul | Sept. 14, 1954 |
| 2,702,787 | Freeland | Feb. 22, 1955 |
| 2,797,196 | Dunn et al. | June 25, 1957 |

FOREIGN PATENTS

| | | |
|---|---|---|
| 420,066 | Great Britain | Nov. 15, 1934 |
| 420,518 | Great Britain | Nov. 23, 1934 |

OTHER REFERENCES

Schwartz et al.: Surface Active Agents, Interscience Publishers, Inc., N.Y., September 1949, pages 214, 215 and 216.